G. BOGEN, Jr.
Lard Drier and Cooler.

No. 167,636.  Patented Sept. 14, 1875.

UNITED STATES PATENT OFFICE.

GEORGE BOGEN, JR., OF CINCINNATI, OHIO.

IMPROVEMENT IN LARD DRIERS AND COOLERS.

Specification forming part of Letters Patent No. 167,636, dated September 14, 1875; application filed May 19, 1875.

*To all whom it may concern:*

Be it known that I, GEORGE BOGEN, Jr., of the city of Cincinnati, Ohio, have invented an Improved Lard Drier and Cooler, of which the following is a specification:

The object of my improvements is the more perfect drying and cooling of lard, so as to enable me to run the lard direct from the drier and cooler into the barrel, and to dispense with what are called lard-cooling tanks, now in use, and at the same time improve the quality of the lard thus treated by taking out all of the moisture that may be in it after it has run out of the lard-rendering tank.

In the accompanying drawings illustrating my invention, in which like letters represent like parts of the improvements—

Figure 1:
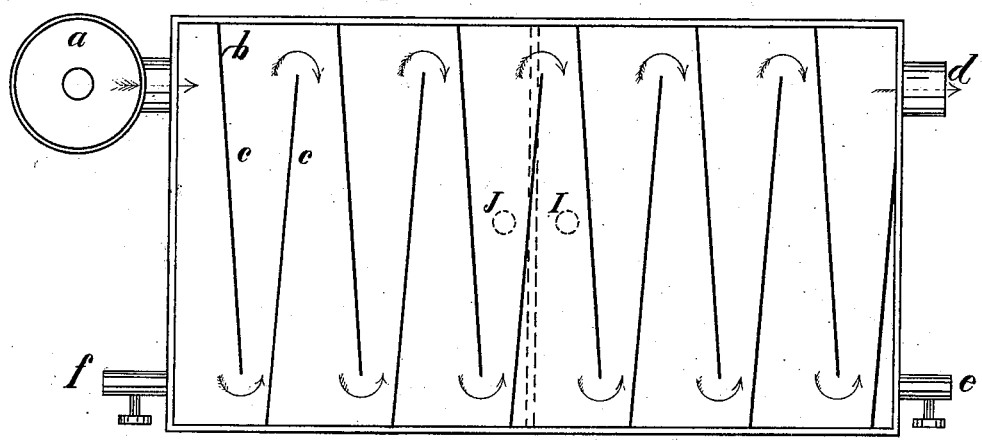

Figure 1 is a plan view of the drier and cooler, showing the general arrangements and its construction. $a$ is what I call the catch-basin. $b$ is the inside of the pan; $c\,c$, the deflecting plates or divisions. $d$ is the outlet from pan $b$. $e$ is the water-inlet into the water-chamber $h$. $f$ is the steam-cock, by which steam is let into the steam-chamber $g$. I is the outlet-cock from the water-chamber $h$. J is the outlet from steam-chamber $g$, shown in Fig. 2 more fully.

Figure 2:
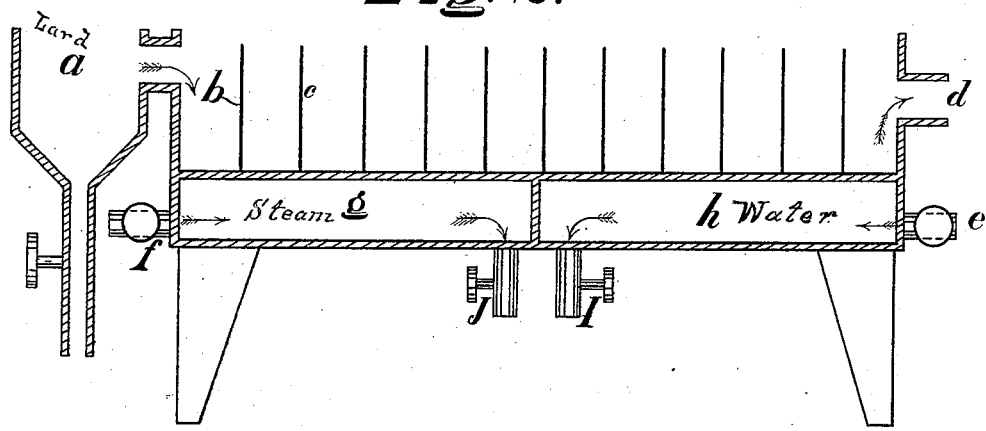

Fig. 2 is a side elevation, (shown in section,) showing the catch-basin $a$, with its waste-pipe at its lower end, and inside of pan $b$, with its deflecting-plates $c\,c$ rising from the bottom of pan $b$ upward, so as to form divisions, around which the lard runs when passing from $a$ to $d$. The steam-chamber $g$, with its inlet and outlet cocks $f$ and J, is separated from the water-chamber $h$ by a partition running across the chamber from side to side, and from the bottom to the under side of pan $b$, and is steam and water tight, so that if water be turned on by the stop-cock $e$ it will remain in its own chamber, unless let out by the cock I.

The operation of my improved drier and cooler is as follows: When the lard is drawn from the rendering-tank it is run into the catch-basin $a$, from which it flows out into the pan $b$. The object of the catch-basin is to allow any impurities that may come out with the lard a place to settle below the surface of the outlet-pipe from $a$ to $b$, and be drawn off from from the bottom of the catch-basin by the cock and pipe attached to it. When the basin is once filled up to its outlet the lard will flow over into the pan $b$, when it will come in contact with the upright deflecting-plate $c$, which, being set at an angle with the sides of the pan $b$, will cause it to flow from its place of entrance toward and around the end of the plate, which is let to stop short of the side on the right-hand side, when it again comes in contact with the second plate $c$, which is also fastened to the side of pan $b$, and be again turned back toward the left-hand side, and so on alternately until it has traveled or run the entire length of the pan, the deflecting-plates being all fastened to the bottom of the pan, and alternately to right and left hand sides tight, so that the lard will have to run in the direction indicated by the arrows until it has arrived at the outlet $d$, where it is run into the receiving or packing barrel ready for shipping without having to be handled by hand from the time of drawing it out of the rendering-tank until ready for market. While the lard is running along the bottom of the pan $b$, and compelled to take the direction shown by the arrows, the lard will travel over a larger amount of surface than it would if allowed to run without the upright plates $c\,c$, and thus be in contact with steam-heated chamber $g$ and water-cooler chamber $h$ a longer time than if it only run on the flat surface of the pan. Before the lard has entered the pan $b$ steam is let into the steam-chamber $g$ by the cock $f$, so as to have its surface hot. When the lard comes out of the rendering-tank it has more or less moisture in it, and by letting it pass over the heated surface the moisture is expelled and evaporated from it. This part of the operation may be carried on as long as is wanted to dry the lard by making the pan longer. After the lard has run over the heated surface of chamber $g$ it runs on to the cold-water chamber $h$, which is filled by letting the water in by the stop-cock $e$, thus presenting the coldest water to the coldest portion of the lard before it is discharged at the outlet $d$. The pressure of the water, as well as the circulation of it, is regulated by the outlet-cock I.

Lard thus treated will be of a better quality than by the old way of first letting it into cooling-tanks, for the following reasons: First, the lard is exposed to more light, and will thus be whiter as it undergoes a bleaching process; secondly, the moisture is expelled from it, and all the impurities are taken up by the catch-basin, and do not come again in contact with the lard, thus leaving it pure and sweet.

I am aware that the above-described pan and its upright deflecting-plates have before been used for cooling lard, and to make the lard travel over a larger surface than by using a plain flat surface, but never in combination with the steam-drying chamber, nor with the cold-water chamber for cooling it, as I use them. I do not claim broadly the use of the pan $b$; but What I do claim is—

1. In a lard cooler and drier, the combination of a catch-basin and two or more chambers, having deflecting sides with openings at alternate ends, substantially as and for the purpose set forth.

2. In a lard cooler and drier, the combination of a catch-basin, two or more chambers, having deflecting sides with openings at alternate ends, and one set or more of heating and cooling chambers beneath said chambers, substantially as and for the purpose set forth.

3. In a lard cooler and drier, the combination of a catch-basin having an outlet-cock and chambers having deflecting sides and openings at alternate ends, substantially as and for the purpose set forth.

4. In a lard cooler and drier, the combination of a catch-basin having outlet-cock with chambers having deflecting sides and openings at alternate ends, and heating and cooling chambers, having outlet-cocks, substantially as arranged, and for the purpose set forth.

GEORGE BOGEN, Jr.

Attest:
SAM. B. COOKE,
GEO. P. BROWN.